US009185682B2

(12) United States Patent
Hsu

(10) Patent No.: US 9,185,682 B2
(45) Date of Patent: Nov. 10, 2015

(54) METHODS TO SUPPORT CONTINUOUS MBMS RECEPTION WITHOUT NETWORK ASSISTANCE

(75) Inventor: Chia-Chun Hsu, Taipei (TW)

(73) Assignee: MEDIATEK INC. (TW)

( * ) Notice: Subject to any disclaimer, the term of this patent is extended or adjusted under 35 U.S.C. 154(b) by 787 days.

(21) Appl. No.: 13/134,735

(22) Filed: Jun. 14, 2011

(65) Prior Publication Data

US 2011/0305184 A1    Dec. 15, 2011

Related U.S. Application Data

(60) Provisional application No. 61/354,791, filed on Jun. 15, 2010.

(51) Int. Cl.
*H04W 72/00*    (2009.01)
*H04L 29/06*    (2006.01)
*H04W 4/06*    (2009.01)
*H04W 36/08*    (2009.01)
*H04W 48/16*    (2009.01)

(52) U.S. Cl.
CPC ............ *H04W 72/00* (2013.01); *H04L 65/4076* (2013.01); *H04W 4/06* (2013.01); *H04W 36/08* (2013.01); *H04W 48/16* (2013.01)

(58) Field of Classification Search
USPC ......... 370/252, 254, 255, 312, 328, 329, 400, 370/401, 465
See application file for complete search history.

(56) References Cited

U.S. PATENT DOCUMENTS 8,750,179 B2 * 6/2014 Purnadi et al. ............... 370/310
2005/0063339 A1 * 3/2005 Jeong et al. .................. 370/331

(Continued)

FOREIGN PATENT DOCUMENTS

CN    1630412 A    6/2005
CN    101242573 A    8/2008

(Continued)

OTHER PUBLICATIONS

International Search Report and Written Opinion of International Search Authority for PCT/CN2011/075762 dated Sep. 29, 2011 (9 pages).

(Continued)

*Primary Examiner* — Yemane Mesfin
*Assistant Examiner* — Mon Cheri Davenport
(74) *Attorney, Agent, or Firm* — Imperium Patent Works; Zheng Jin; Helen Mao

(57) ABSTRACT

In an LTE/LTE-A system, a UE subscribes to an MBMS service in a source cell. In one embodiment, the UE with ongoing MBMS service handovers to a target cell. The UE obtains MBMS information of the target cell before or after the handover. The UE then determines MBMS service continuity in the target cell based on the obtained MBMS information. In another embodiment, the UE with ongoing MBMS service reselects a new cell. The UE makes cell reselection decision based on obtained MBMS information of its neighbor cells. If the subscribed MBMS service is discontinued after handover or cell reselection, the UE releases MBMS bearer and informs a NAS entity. If the subscribed MBMS service is available after handover or cell reselection, the UE keeps MBMS bearer during handover or cell reselection. By acquiring MBMS information, the UE is able to maintain continuous MBMS reception after handover or cell reselection.

13 Claims, 5 Drawing Sheets

METHOD OF MBMS SERVICE CONTINUITY AFTER HANDOVER

(56) References Cited

U.S. PATENT DOCUMENTS

| | | | |
|---|---|---|---|
| 2005/0090278 A1 | 4/2005 | Jeong et al. | 455/525 |
| 2005/0111393 A1 | 5/2005 | Jeong et al. | 370/312 |
| 2005/0213583 A1 | 9/2005 | Lee et al. | 370/395.5 |
| 2006/0034205 A1 | 2/2006 | Kim | 370/312 |
| 2006/0050672 A1 | 3/2006 | Shim et al. | 370/338 |
| 2006/0058034 A1 | 3/2006 | Vaittinen et al. | 455/450 |
| 2008/0084871 A1 | 4/2008 | Wang et al. | 370/352 |
| 2008/0212546 A1 | 9/2008 | Fischer | 370/338 |
| 2008/0268878 A1 | 10/2008 | Wang et al. | 455/458 |
| 2008/0287129 A1 | 11/2008 | Somasundaram et al. | 455/436 |
| 2009/0122740 A1 | 5/2009 | Bouazizi | 370/312 |
| 2009/0180417 A1* | 7/2009 | Frost et al. | 370/312 |
| 2010/0056137 A1 | 3/2010 | Kamei | 455/426.1 |
| 2010/0093352 A1 | 4/2010 | Kubota | 455/436 |
| 2010/0110945 A1* | 5/2010 | Koskela et al. | 370/310 |
| 2010/0113030 A1 | 5/2010 | Kanazawa et al. | 455/437 |
| 2010/0159933 A1 | 6/2010 | Kim et al. | 455/436 |
| 2010/0189027 A1 | 7/2010 | Ishida et al. | 370/312 |
| 2011/0019605 A1* | 1/2011 | Ma et al. | 370/312 |
| 2011/0039551 A1 | 2/2011 | Tsuboi et al. | 455/424 |
| 2011/0077006 A1* | 3/2011 | Hsu | 455/436 |
| 2011/0141908 A1 | 6/2011 | Ishida et al. | 370/241 |
| 2011/0222457 A1* | 9/2011 | Lee et al. | 370/312 |
| 2011/0305183 A1* | 12/2011 | Hsu et al. | 370/312 |
| 2011/0305184 A1 | 12/2011 | Hsu | 370/312 |
| 2013/0051298 A1* | 2/2013 | Drevo | 370/312 |
| 2013/0229974 A1* | 9/2013 | Xu et al. | 370/312 |
| 2014/0031038 A1* | 1/2014 | Wang et al. | 455/436 |
| 2014/0140260 A1* | 5/2014 | Wang et al. | 370/312 |
| 2015/0071160 A1* | 3/2015 | Zeng et al. | 370/312 |

FOREIGN PATENT DOCUMENTS

| | | |
|---|---|---|
| CN | 101595742 A | 12/2009 |
| CN | 101675671 A | 3/2010 |
| JP | 2005223718 | 8/2005 |
| JP | 2007201941 | 8/2007 |
| JP | 2007522758 | 8/2007 |
| JP | 2008503148 | 1/2008 |
| JP | 2008511218 | 4/2008 |
| JP | 2008514047 | 5/2008 |
| JP | 2009188612 | 8/2009 |
| JP | 2009206858 | 9/2009 |
| WO | WO2008155915 | 12/2008 |
| WO | WO 2009053879 A1 | 4/2009 |
| WO | WO2009133764 | 11/2009 |
| WO | WO2009133767 | 11/2009 |
| WO | WO2010018658 | 2/2010 |

OTHER PUBLICATIONS

SIPO, the First Examine Opinion of Chinese patent application 201180001834.9 dated Jul. 2, 2013 (8 pages).

3GPP TSG-RAN WG2 #67bis R2-095689, LG Electronics Inc.; "Discussion on Service Continuity"; Miyazaki, Japan, Oct. 12-16, 2009 (4 pages).

USPTO, Office Action for related U.S. Appl. No. 13/134,708 dated Jun. 4, 2014 (23 pages).

Taiwan IPO, Office Action for TW patent application 100120834 dated Jan. 14, 2014 (7 pages).

JPO, Office Action for JP patent application 2013-513544 dated Jan. 14, 2014 (4 pages).

JPO, Office Action for JP patent application 2013-513545 dated Jan. 21, 2014 (4 pages).

International Search Report and Written Opinion of International Search Authority for PCT/CN2011/075777 dated Sep. 29, 2011 (12 pages).

SIPO, Examination Report of Chinese patent application 201180001837.2 dated Apr. 27, 2013 (10 pages).

USPTO, Office Action for related U.S. Appl. No. 13/134,708 dated Jun. 19, 2013 (19 pages).

USPTO, Office Action for related U.S. Appl. No. 13/134,708 dated Oct. 2, 2013 (26 pages).

USPTO, Office Action for related U.S. Appl. No. 13/134,708 dated Dec. 16, 2014 (26 pages).

JPO, Office Action for the JP patent application 2014-087611 dated Nov. 25, 2014 (5 pages).

USPTO, Office Action for related U.S. Appl. No. 13/134,708 dated Apr. 13, 2015 (22 pages).

Taiwan IPO, Office Action for the TW patent application 100120835 dated Feb. 12, 2015 (6 pages).

JPO, Office Action for the JP patent application 2014-087610 dated Mar. 17, 2015 (5 pages).

* cited by examiner

METHOD OF MBMS SERVICE CONTINUITY AFTER HANDOVER

METHOD OF MBMS SERVICE CONTINUITY AFTER RESELECTION

METHODS TO SUPPORT CONTINUOUS MBMS RECEPTION WITHOUT NETWORK ASSISTANCE

CROSS REFERENCE TO RELATED APPLICATIONS

This application claims priority under 35 U.S.C. §119 from U.S. Provisional Application No. 61/354,791, entitled "Methods to Support MBMS Mobility and Dedicated MCCH LCID Enhancement", filed on Jun. 15, 2010, the subject matter of which is incorporated herein by reference.

TECHNICAL FIELD

The disclosed embodiments relate generally to Multimedia Broadcast and Multicast Service (MBMS), and, more particularly, to support continuous MBMS service reception for user equipments (UE) without network assistance.

BACKGROUND

A Long-Term Evolution (LTE) system offers high peak data rates, low latency, improved system capacity, and low operating cost resulting from simple network architecture. An LTE system also provides seamless integration to older wireless networks, such as Global System for Mobile Communications (GSM), Code Division Multiple Access (CDMA), and Universal Mobile Telecommunication System (UMTS). In LTE systems, an evolved universal terrestrial radio access network (E-UTRAN) includes a plurality of evolved Node-Bs (eNBs) communicating with a plurality of mobile stations, referred as user equipments (UEs).

Enhancements to LTE systems are considered by the third Generation Partnership Project (3GPP) so that they can meet or exceed International Mobile Telecommunications Advanced (IMT-Advanced) fourth generation (4G) standard. One of the key enhancements is to support bandwidth up to 100 MHz and be backwards compatible with the existing wireless network system. Carrier aggregation (CA), where two or more component carriers (CCs) are aggregated, is introduced into LTE-Advanced systems to improve overall system throughput.

Multimedia Broadcast and Multicast Service (MBMS) is a broadcasting service offered via existing GSM and UMTS cellular networks. Recently, evolved MBMS (E-MBMS) has been introduced in the LTE specification for broadcasting or multicasting TV, films, and other information such as overnight transmission of newspapers in a digital form. To facilitate MBMS in LTE systems, a multicast control channel (MCCH) is used for the transmission of MBMS control information in each MBMS Single Frequency Network (MBSFN) area, and a multicast traffic channel (MTCH) is used for the transmission of user traffic to UEs receiving MBMS data packets. MBMS has the major benefit that the network infrastructure already exists for mobile network operators and that deployment can be cost effective compared with building a new network for the service. The broadcast capability enables to reach unlimited number of users with constant network load. The broadcast capability also enables the possibility to broadcast information simultaneously to many cellular subscribers, such as emergency alerts.

An important feature of a mobile wireless system such as LTE is the support for seamless mobility across eNBs and the entire network. Fast and seamless handover (HO) is particularly important for delay-sensitive services such as VoIP. Likewise, MBMS service continuity is also important for MBMS user experience. The mobility of a UE should affect MBMS service reception as less as possible. However, there is no network-assisted MBMS service continuity supported by the current LTE specification (e.g., in LTE Rel-9). Before any network solution is available, MBMS service continuity can only be supported by UE-centric solution. Furthermore, with the addition of carrier aggregation (CA) in LTE-A systems, and with the possibility of network base stations (e.g., eNBs) covered by multiple MBSFN areas, it is foreseeable that an eNB can be associated with more than one MBSFN areas. UE-centric solution for MBMS service continuity under such scenario is also desirable.

SUMMARY

In an LTE/LTE-A system, a UE subscribes to an MBMS service in a source cell. Solutions for maintaining MBMS service continuity after handover or cell reselection without network assistance are provided. In one embodiment, the UE with ongoing MBMS service handovers to a target cell. The UE obtains MBMS information of the target cell before or after the handover. The MBMS information comprises an MBSFN area ID and a list of MBMS service IDs supported by the target cell. The UE then determines MBMS service continuity in the target cell based on the obtained MBMS information. The UE releases MBMS bearer and informs a non-access stratum (NAS) entity if the subscribed MBMS service is discontinued after handover. The UE keeps MBMS bearer during handover if the subscribed MBMS service is available after handover operation.

In another embodiment, the UE with ongoing MBMS service reselects a new cell. The UE makes cell reselection decision based on obtained MBMS information of its neighbor cells. If the subscribed MBMS service is discontinued after cell reselection, the UE releases MBMS bearer and informs a NAS entity. If the subscribed MBMS service is available after cell reselection, the UE keeps MBMS bearer during cell reselection. By acquiring MBMS information, the UE is able to maintain continuous MBMS reception after handover or cell reselection.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
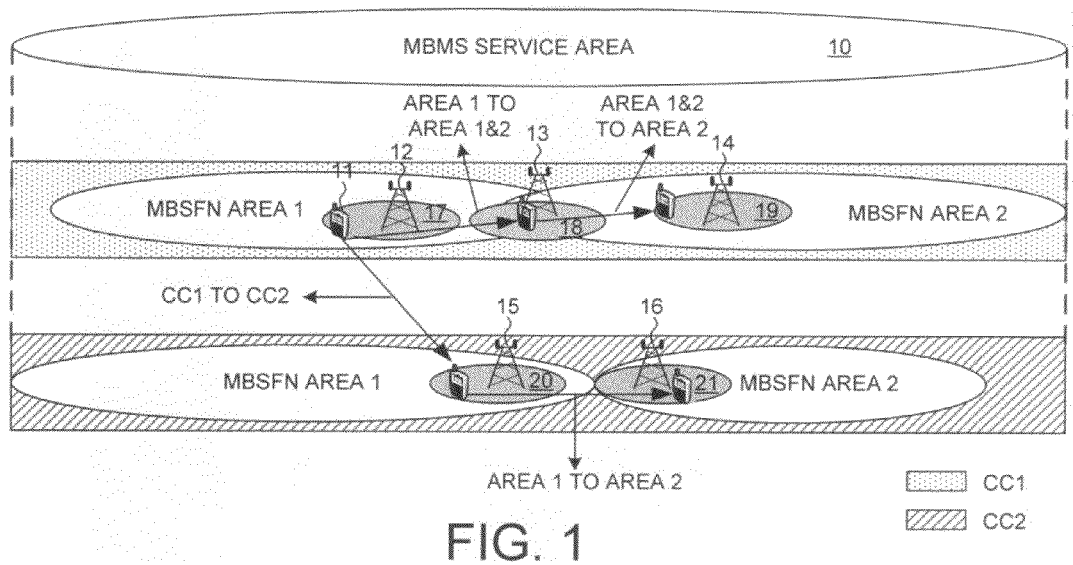
FIG. 1 illustrates a user equipment (UE) that supports MBMS service continuity in accordance with one novel aspect.

FIG. 1 illustrates a user equipment (UE) 11 that supports service continuity in Multimedia Broadcasting and Multicasting Service (MBMS) service (or synchronization) area 10 in accordance with one novel aspect. MBMS service area 10 covers multiple MBMS Single Frequency Network (MBSFN) areas (e.g., MBSFN area 1 and MBSFN area 2). An MBSFN area comprises a group of cells within an MBSFN service area of a network that are co-ordinate to achieve MBSFN transmission. An MBSFN service area is defined as an area of network in which all evolved Node-Bs (eNBs) can be synchronized to perform MBSFN transmission. MBMS service areas are capable of supporting one or more MBSFN areas. On a given frequency layer, an eNB can only belong to one MBMS service area. Under the MBMS service area, a cell can belong to one or more MBSFN area and support MBMS services for all the belonging MBSFN areas.

In the example of FIG. 1, eNB12 belongs to MBSFN area 1 and serves cell 17 for MBMS service over component carrier 1 (CC1), eNB13 belongs to both MBSFN area 1 and area 2 and serves cell 18 for MBMS service over CC1, eNB 14 belongs to MBSFN area 2 and serves cell 19 for MBMS service over CC1, eNB15 belongs to MBSFN area 1 and serves cell 20 for MBMS service over CC2, and eNB16 belongs to MBSFN area 2 and serves cell 21 for MBMS service over CC2. UE11 initially subscribes to a specific MBMS service in cell 17 served by eNB12, and later moves around to different cells served by different eNBs. In one example, UE11 first receives subscribed MBMS service in MBSFN area 1 in cell 17, then moves to MBSFN area 1&2 in cell 18, and then moves to MBSFN area 2 in cell 19. In another example, UE11 first receives MBMS service in MBSFN area 1 in cell 17, then moves to MBSFN area 1 in cell 20, and then moves to MBSFN area 2 in cell 21. When UE11 moves from cell to cell, UE11 will either perform handover or cell reselection. It is thus desirable that UE11 is able to continue to receive the subscribed MBMS service without service interruption after handover or cell reselection.

In LTE systems, two radio resource control (RRC) states namely RRC_IDEL and RRC_CONNECTED are defined. A UE moves from RRC_IDLE state to RRC_CONNECTED state when an RRC connection is successfully established. A UE can move back from RRC_CONNECTED state to RRC_IDLE state by releasing the RRC connection. In the RRC_IDLE state, UE can receive broadcast/multicast data, monitors a paging channel to detect incoming calls, performs neighbor cell measurements and cell selection/reselection, and acquires system information. Mobility is controlled by the UE in the RRC_IDLE state. In the RRC_CONNECTED state, the transfer of unicast data to/from UE, and the transfer of broadcast/multicast data to UE can take place. The UE monitors control channels associated with the shared data channel to determine scheduled data, provides channel quality feedback information, performs neighbor cell measurements and measurement reporting, and acquires system information. Unlike the RRC_IDLE state, mobility and handovers in the RRC_CONNECTED state are network-controlled and assisted by the UE.

In one novel aspect, when UE11 is in RCC_CONNECTED state, UE11 with ongoing MBMS services acquires MBMS information of a target cell before or after handover to maintain service continuity if possible. Similarly, when UE11 is in RCC_IDLE state, UE11 with ongoing MBMS services acquires MBMS information of neighbor cells for mobility and service continuity decision.

Figure 2:
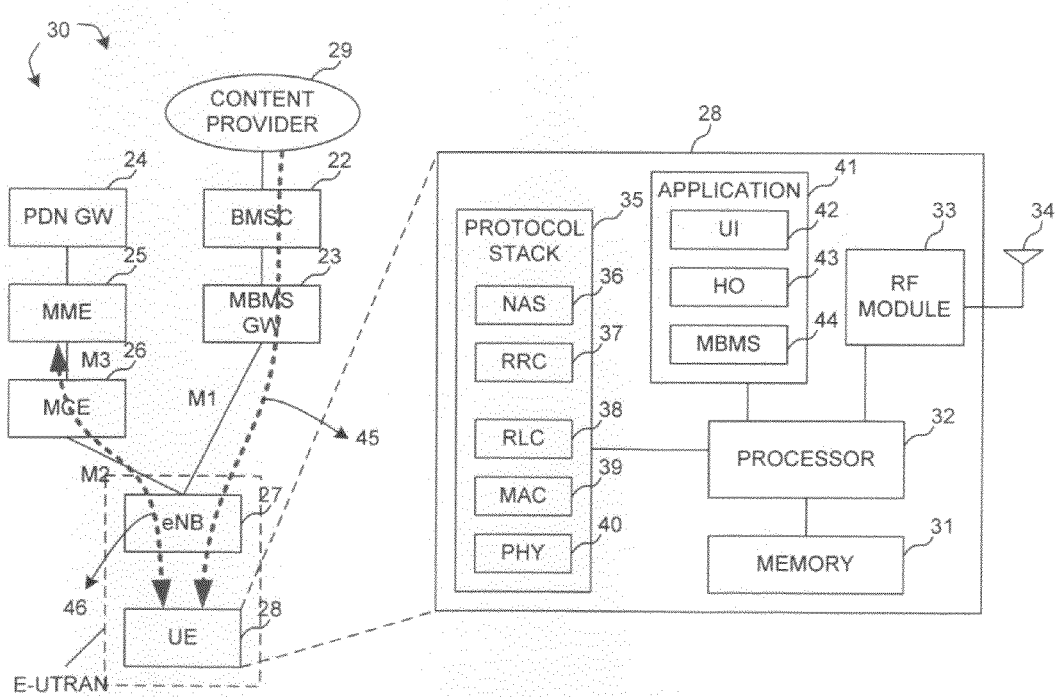
FIG. 2 illustrates a logical architecture of an E-UTRAN network supporting MBMS service in accordance with one novel aspect.

FIG. 2 illustrates a logical architecture of an LTE network 30 supporting MBMS service in accordance with one novel aspect. LTE network 30 comprises a content provider 29, a Broadcast Multicast Service Center (BMSC) 22, an MBMS gateway (MBMS GW) 23, a packet data network gateway (PDN GW) 24, a mobility management entity (MME) 25, a multi-cell/multicast coordination entity (MCE) 26, an eNB 27, and a UE 28. UE 28 comprises memory 31, a processor 32, a radio frequency (RF) module 33 coupled to antenna 34, a protocol stack module 35 supporting various protocol layers including NAS36, RRC37, RLC38, MAC39 and PHY40, and an application module 41 including a user interface (UI) module 42, a handover (HO) module 43, and an MBMS control module 44. The various modules are function modules and may be implemented by software/firmware/hardware. The function modules, when executed by processor 32, interwork with each other to allow UE 28 to receive MBMS services and to maintain service continuity after handover or cell reselection. For example, HO module 42 performs handover or cell reselection procedure, UI module 43 prompts user for service continuity decision, and MBMS control module 44 acquires MBMS information of target/neighbor cells to facilitate the support for service continuity with less service interruption.

When UE 28 subscribes to a specific MBMS service, MBMS data packets are transmitted from content provider 21, through BMSC 22, through MBMS GW 23, through eNB 27, and then to UE 28 (e.g., depicted by a thick dotted line 45). On the other hand, MBMS control information is communicated between MME 25 and UE 28 via MCE 26 and eNB 27 (e.g., depicted by a thick dotted line 46). As illustrated in FIG. 2, eNB 27 is connected to MBMS GW 23 via a pure user plane interface M1. In addition to the M1 interface, two control plane interfaces M2 and M3 are defined. The application part on the M2 interface conveys radio configuration information between eNB 27 and MCE 26, and the application part on the M3 interface performs MBMS session control signaling on MBMS bearer level between MCE 26 and MME 25. MCE 26 is a logical entity, which can also be part of another network element such as inside eNB 27. MCE 26 performs functions such as the allocation of the radio resources used by all eNBs in the MBSFN area as well as determining the radio configuration including the modulation and coding scheme. MBMS GW 23 is also a logical entity whose main function is sending/broadcasting MBMS packets with a SYNC protocol to each eNB transmitting a corresponding MBMS service.

Figure 3:
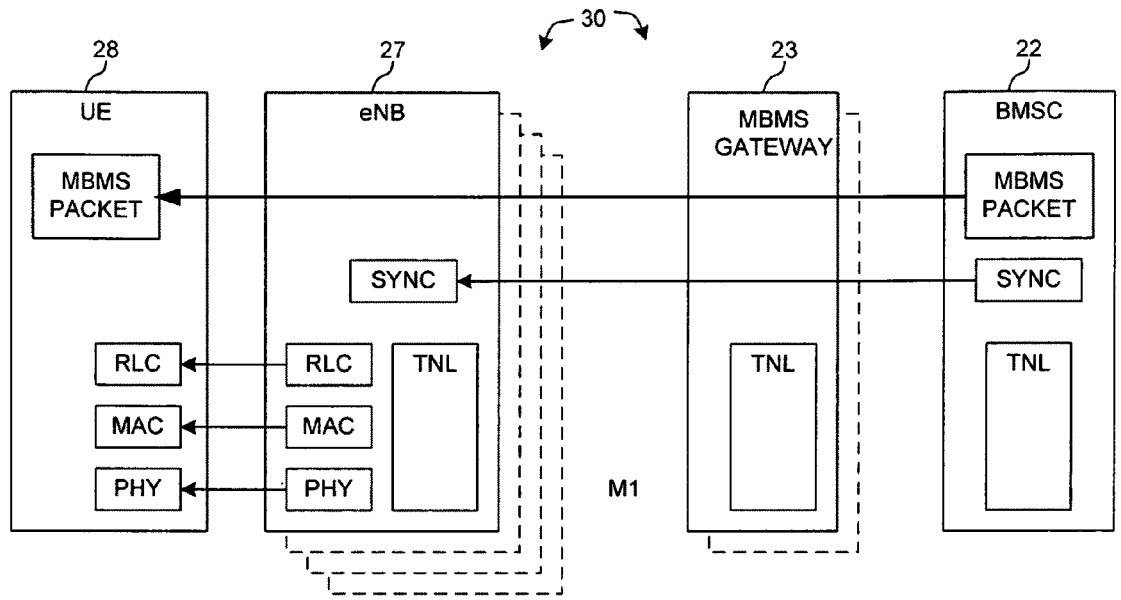
FIG. 3 illustrates MBMS user plane protocol architecture in an LTE network.

FIG. 3 illustrates an MBMS user plane protocol architecture in LTE network 30. LTE network 30 provides multi-cell MBMS service transmission. An important requirement for multi-cell MBMS service transmission is MBMS content synchronization to enable MBSFN operation. A SYNC protocol layer is defined on the transport network layer (TNL) to support the content synchronization mechanism. The SYNC protocol carries additional information that enables eNBs to identify the timing for radio frame transmission as well as detect packet loss. As illustrated in FIG. 3, the SYNC protocol is supported over the M1 interface between BMSC 22 and eNB 27.

Figure 4:
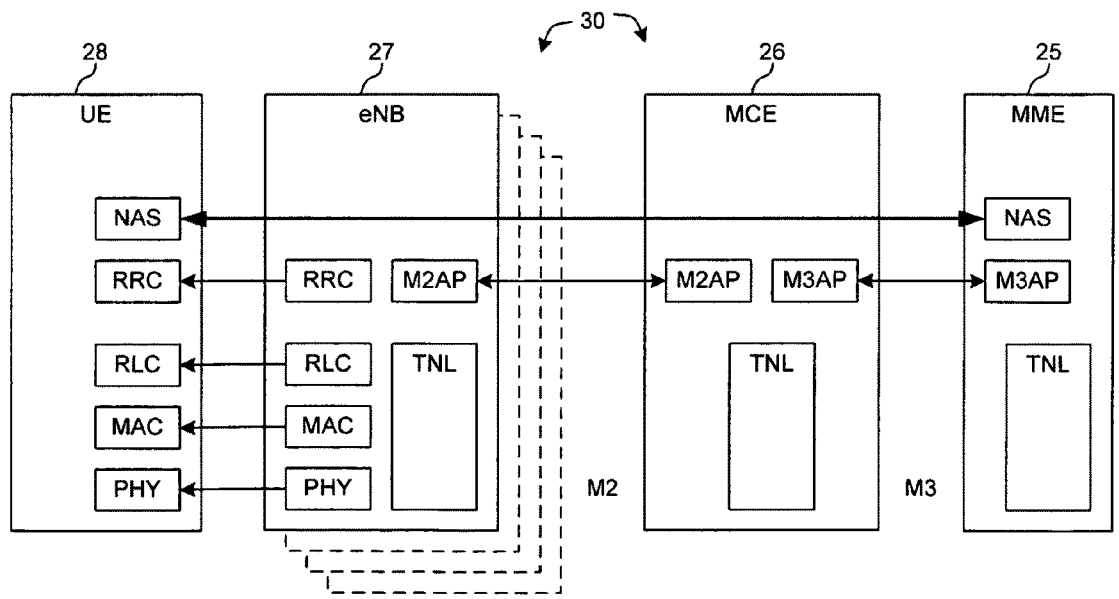
FIG. 4 illustrates MBMS control plane protocol architecture in an LTE network.

FIG. 4 illustrates an MBMS control plane protocol architecture in LTE network 30. One important application of the M3 interface is MBMS session control signaling. MBMS session control signaling on Evolved Packet System (EPS) bearer level is triggered by the Evolved Packet Core to establish a virtual connection between the UE and the PDN-GW (e.g., an "EPS bearer" that provides a "bearer service"—a transport service with specific QoS attributes). The MBMS session start procedure is to request the E-UREAN to notify the UE about an upcoming MBMS Session of a given MBMS Bearer Service and to establish an MBMS E-RAB for this MBMS Session. The MBMS session stop procedure is to request the E-UTRAN to notify the UE about the end of a given MBMS Session and to release the corresponding MBMS E-RAB for this MBMS Session. In addition, as illustrated in FIG. 4, UE 28 communicates with MME 25 via the NAS layer for MBMS service continuity. NAS protocol supports the mobility of the UE and the session management procedures to establish and maintain IP connectivity between the UE and the PDN GW. In general, NAS can also be used by an operator to provide a predefined MBMS program list. From user point of view, MBMS service reception is triggered by NAS. For example, NAS prompts up the program list when a user wants to receive MBMS service. Upon selecting a specific program, the UE radio starts to search a proper cell to receive the service.

In Radio Link Control (RLC) layer, multiple MBMS services can be mapped to the same multicast channel (MCH) and one MCH contains data belonging to only one MBSFN area. Scheduling of MCH is done by the MCE. In MAC layer, MBMS services between the MCH and logical channels includes a multicast traffic channel (MTCH) and a multicast control channel (MCCH), which are point-to-multipoint channels for transmitting MBMS data packets and MBMS control information. Within the MBSFN subframes, the MCH subframe allocation pattern (MSAP) for every MCH carrying MTCH is signaled on MCCH. MCCH is utilized for each MBSFN area and carriers a message that lists all the MBMS services or programs with ongoing sessions. MCCH change notification is done by an MBMS radio network temporary identifier (M-RNTI) on the physical downlink control channel (PD-CCH) in PHY layer. MCH is carried by Physical Multicast Channel (PMCH) in PHY layer.

An important feature of a mobile wireless system such as LTE/LTE-A is the support for seamless mobility across eNBs and MME-GWs. To support continuous MBMS reception, UEs that are receiving MBMS services in RRC_IDEL state performing cell reselection or are in RRC_CONNECTED state needs to obtain neighbor/target cell MTCH information from the MCCH of the neighbor/target cell. However, mechanisms to deliver the MCCH to the UEs via cell reselection or handover procedure are not supported in the current LTE specification. In accordance with one novel aspect, UE-centric solutions without network assistance are thus proposed to support MBMS service continuity. Various embodiments and examples are now described below with accompanying drawings.

Figure 5:
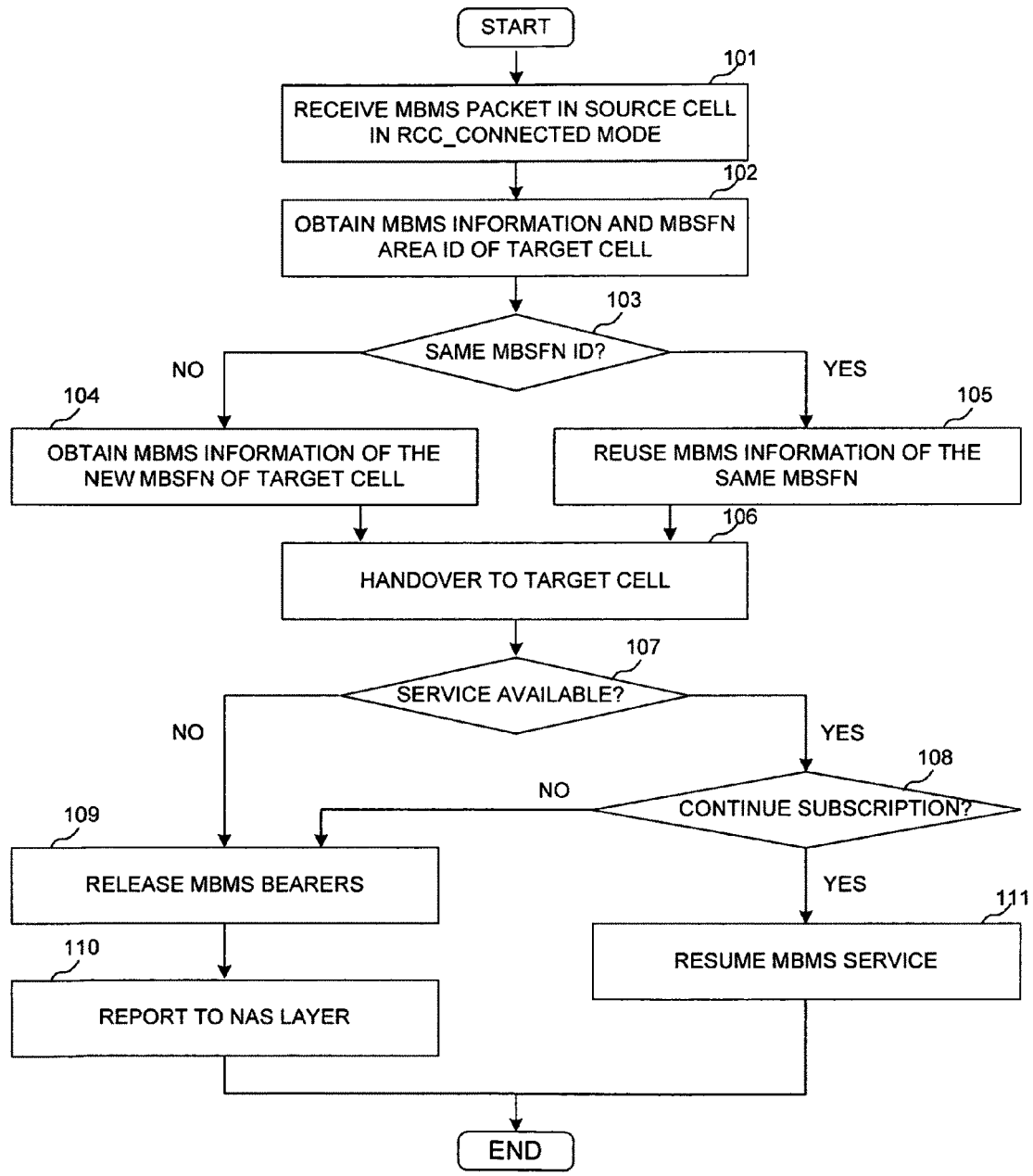
FIG. 5 is a flow chart of a method of continuous MBMS service reception after handover in accordance with one novel aspect.

FIG. 5 is a flow chart of a method of supporting MBMS service continuity after handover in an E-UTRAN network in accordance with one novel aspect. In the example of FIG. 5, a UE is connected to an eNB in a source cell (e.g., UE in RCC_CONNECTED state). In step 101, the UE subscribes to a specific MBMS service and receives MBMS packets in the source cell. Later on, the UE moves away from the source cell towards a target cell. In step 102, the UE acquires MBMS information of the target cell before or after handover. The MBMS information generally includes MBSFN subframe configuration in System Information Block 2 (SIB2), MBSFN area ID and MCCH configuration in SIB13, and PMCH configuration and MBMS service list in MCCH. When acquiring the MBMS information of the target cell, the UE first reads the broadcasted system information, e.g. SIB2 and SIB13, for the MBSFN subframe configuration, MBSFN area ID, and MCCH configuration. After that, the UE then acquires the PMCH configuration and the MBMS service list from MCCH according to the MCCH configuration. In step 103, the UE compares the MBSFN area ID of the target cell with the MBSFN area ID of the source cell. If the area IDs are different, then the UE acquires the remaining MBMS information of the target cell (step 104). Otherwise, if the area ID is the same, then the UE reuses the same MBMS information of the source cell without reacquiring such information from the target cell (step 105).

Based on radio connection and network condition, the E-UTRAN triggers a handover procedure for the UE (step 106). The UE thus handovers from the source cell to the target cell after the handover procedure. The UE then determines whether service continuity is possible in the target cell (step 107). For example, if the MBSFN area ID of the target cell is the same as the MBSFN area ID of the source cell, then service continuity is possible. On the other hand, if the MBSFN area ID is different, then the UE needs to find out whether the subscribed MBMS service is also provided in the target cell by searching the MBMS service list from the MCCH of the target cell. If the same MBMS service cannot be continued in the target cell, then the UE releases MBMS bearers, i.e. releasing the MBMS configuration of different layers including RLC, MAC, and PHY layer. In step 109. The UE also reports the termination of MBMS service to an upper layer NAS entity in step 110.

If MBMS service continuity is possible, the UE may still wants to determine whether to continue the same service after handover (step 108). In one example, service continuity in the target cell is automatic as long as it is possible. In another example, however, the upper layer NAS entity may provide a prompt asking whether a user would like to continue the subscribed MBMS service in the target cell. If the user chooses not to continue the subscribed MBMS service, then the UE completes the procedure with step 109 and 110. If the user chooses to continue the subscribed MBMS service, then the UE resumes MBMS service reception without releasing/resetting the MBMS bearers (step 111). In one advantageous aspect, the MBMS bearers are not released or reset during handover as long as MBMS service continuity is possible. Because the MBMS bearers can resume when other bearers are still suspended, MBMS service reception can be resumed regardless of the status of other bearers. By keeping the MBMS bearers during handover, the subscribed MBMS service is resumed with minimum interruption.

Figure 6:
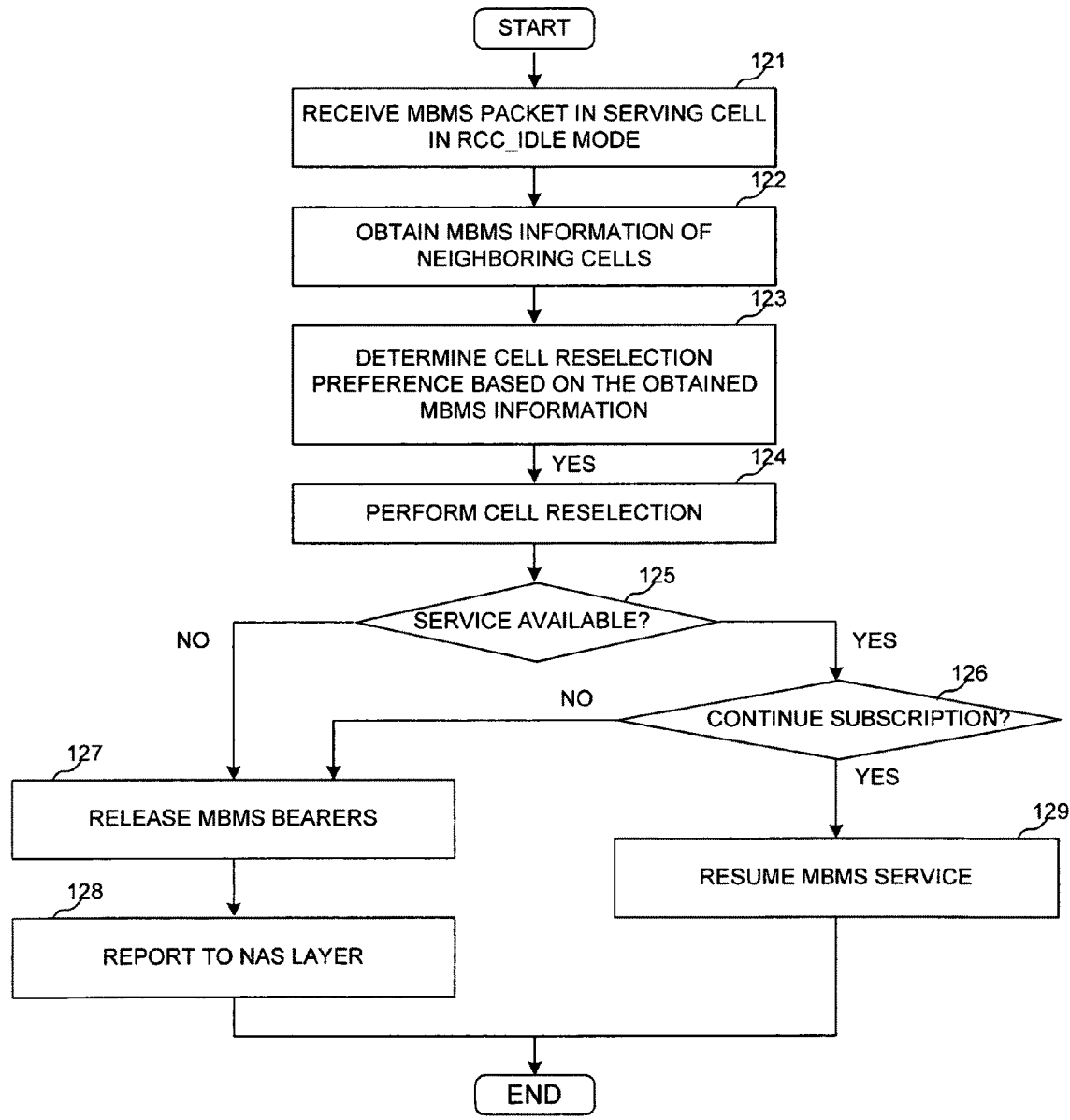
FIG. 6 is a flow chart of a method of continuous MEMS service reception after cell reselection in accordance with one novel aspect.

FIG. 6 is a flow chart of a method of supporting MBMS service continuity after cell reselection in an E-UTRAN network in accordance with one novel aspect. In the example of FIG. 6, a UE is located in a source cell but is not connected to any eNB (e.g., UE in RCC_IDLE state). In step 121, the UE subscribes to a specific MBMS service and receives MBMS packets in the source cell. Later on, the UE moves away from the source cell towards one or more neighbor cells. In step 122, the UE acquires MBMS information of the neighbor cells. The MBMS information generally includes MBSFN subframe configuration in System Information Block 2 (SIB2), MBSFN area ID and MCCH configuration in SIB13, and PMCH configuration and MBMS service list in MCCH of the neighbor cells. After reading the MBMS information of the neighbor cells, cell reselection decision is then made in step 123. In one example, an upper layer NAS entity provides a prompt asking a user to make the decision of whether to reselect to another cell and which cell is to be reselected by the UE. In another example, the cell reselection decision is made based on a predefined algorithm or priority via RRC messaging. For instance, when there is ongoing MBMS service reception in the source cell, MBMS cells with the subscribed service are prioritized over cells without the subscribed service.

In step 124, The UE performs cell reselection. The UE then determines whether service continuity is possible in the target cell (step 125). For example, if the MBSFN area ID of the target cell is the same as the MBSFN area ID of the source cell, then service continuity is possible. On the other hand, if the MBSFN area ID is different, then the UE needs to find out whether the subscribed MEMS service is also provided in the target cell by searching the MBMS service list from the MCCH of the target cell. If the same MBMS service cannot be continued in the target cell, then the UE releases MBMS bearers in step 127. The UE also reports the termination of MBMS service to an upper layer NAS entity in step 128.

If MBMS service continuity is possible, the UE may still wants to determine whether to continue the same service after cell reselection (step 126). In one example, service continuity in the target cell is automatic as long as it is possible. In another example, however, the upper layer NAS entity may provide a prompt asking a user whether the user would like to continue the subscribed MBMS service in the target cell. If the user chooses not to continue the subscribed MBMS service, then the UE completes the procedure with step 127 and 128. If the user chooses to continue the subscribed MBMS service, then the UE resumes MBMS service reception without releasing/resetting the MBMS bearers (step 129). In one advantageous aspect, the MBMS bearers are not released or reset during cell reselection as long as MBMS service continuity is possible. Because the MBMS bearers can resume when other bearers are still suspended, MBMS service reception can be resumed regardless of the status of other bearers. By keeping the MBMS bearers during cell reselection, the subscribed MBMS service is resumed with minimum interruption. Likewise, when the UE changes its state from RCC_CONNECTED to RCC_IDEL, the UE does not release MBMS bearers if it is receiving any ongoing MBMS service.

With the addition of carrier aggregation (CA) introduced in LTE-Advanced systems, and the possibility of network base stations (e.g., eNBs) covered by multiple MBSFN areas, it is foreseeable that an eNB can be associated with more than one MBSFN areas. For example, an eNB has more than one CCs (e.g., CC1 and CC2), and belongs to one MBSFN area #1 on CC1 and another MBSFN area #2 on CC2. How to maintain MBMS service continuity for a UE under such scenario after handover or cell reselection is now described below with more details.

Figure 7:
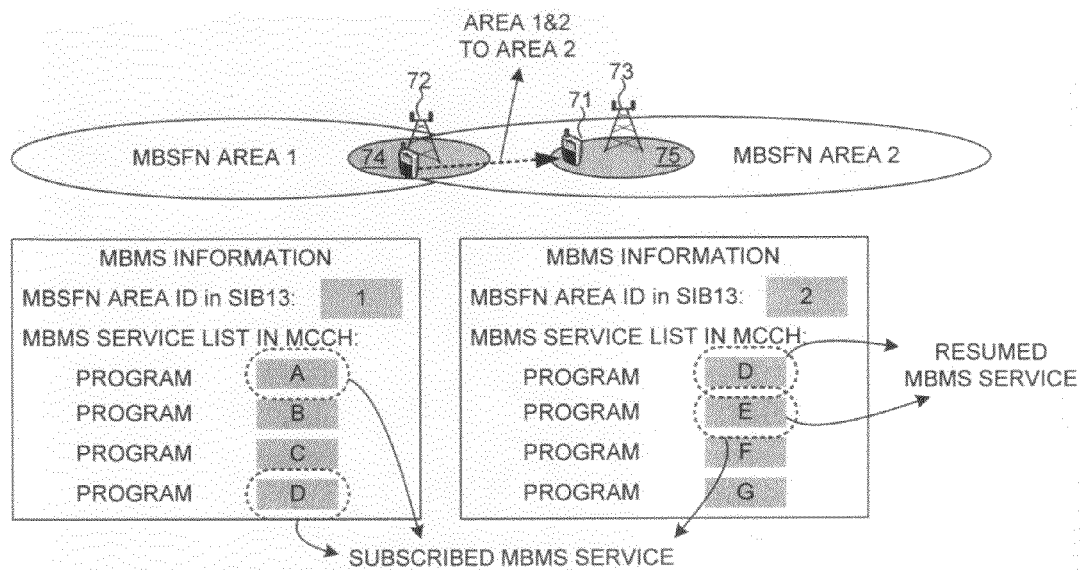
FIG. 7 illustrates one embodiment of MBMS service continuity when a source cell or target cell is associated with multiple MBSFN areas.

FIG. 7 illustrates one embodiment of MBMS service continuity when a serving cell or target cell is associated with multiple MBSFN areas. In the example of FIG. 7, UE71 is first connected to eNB72 in source cell 74. Source eNB72 belongs to multiple MBSFN areas, e.g., MBSFN area 1 and MBSFN area 2. Each MBSFN area provides a list of MBMS services or programs. For example, MBSFN area 1 provides programs A, B, C, and D, while MBSFN area 2 provides programs D, E, F, and G. Because UE71 is located in cell 74 covered by both MBSFN areas 1 and 2, UE71 can subscribe MBMS services or programs from either MBSFN area or both. Later on, UE71 moves towards another eNB73 in a neighbor or target cell 75 and will be triggered by the network for handover operation. Because target eNB73 belongs to only one MBSFN area 2, UE71 can subscribe MBMS services or programs only from MBSFN area 2 after handover from source cell 74 to target cell 75.

In one novel aspect, UE71 obtains MBMS information of target cell 75 before or after handover from cell 74 to cell 75 such that maximum service continuity can be maintained after handover for each of the interested services. Based on the obtained MBMS information, if the subscribed MBSFN areas also exist in the target cell, then the UE automatically continues to receive the subscribed services from those MBSFN areas. On the other hand, if the subscribed MBSFN areas do not exist in the target cell, then the UE reads the MCCH of the target cell to find out whether the subscribed services are provided in the new MBSFN areas. In addition, for each interested MBMS service, UE71 may apply the method illustrated in FIG. 5 for continuous service reception.

Now take FIG. 7 as an example. In source cell 74, UE71 initially subscribes programs A and D from MBSFN area 1 and program E from MBSFN area 2, and then starts to receive MBMS packets for these three interested programs. Before or after UE71 handovers from source cell 74 to target cell 75, UE71 obtains MBMS information of target cell 75. From the obtained MBMS information, UE71 knows that MBSFN area 2 is available in target cell 75, but MBSFN area 1 is not available in target cell 75 (e.g., by reading MBSFN area ID in SIB13). As a result, UE71 continues to receive subscribed program E from MBSFN area 2. In addition, UE71 reads the MCCH of target cell 75 and knows that program D is also provided from MBSFN area 2, but program A is not provided in MBSFN area 2. UE71 thus continues to receive service for program D and stops receiving service for program A.

Figure 8:
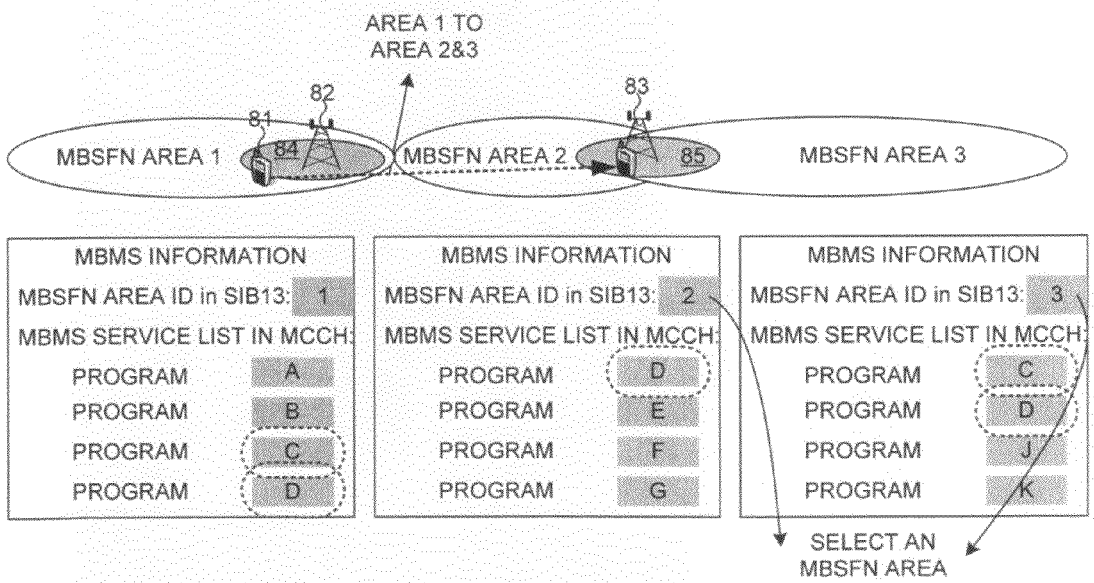
FIG. 8 illustrates another embodiment of MBMS service continuity when a source cell or target cell is associated with multiple MBSFN areas.

FIG. 8 illustrates another embodiment of MBMS service continuity when a serving cell or target cell is associated with multiple MBSFN areas. In the example of FIG. 8, UE81 is first connected to eNB82 in source cell 84. Source eNB82 belongs to MBSFN area 1. MBSFN area 1 provides a list of MBMS programs A, B, C, and D. Because UE81 is located in cell 84, UE81 can subscribe to any MBMS services or programs from MBSFN area 1. Later on, UE81 moves towards another eNB83 in a neighbor or target cell 85 and will be triggered by the network for a handover operation. Target eNB83 belongs to both MBSFN area 2 and MBSFN area 3. MBSFN area 2 provides a list of MBMS programs D, E, F, and G, while MBSFN area 3 provides a list of MBMS programs D, H, I, and J. Ideally, UE81 can subscribe MBMS services or programs from both MBSFN area 2 and MBSFN area 3 after handover from source cell 84 to target cell 85.

In some situations, although target eNB83 can belong to multiple MBSFN areas (e.g., over multiple carrier frequencies), however, UE81 can only subscribe to services or programs from one MBSFN area due to UE capability (e.g., single carrier frequency).

In one novel aspect, UE81 obtains MBMS information of target cell 85 before or after handover from cell 84 to cell 85 such that maximum service continuity can be maintained after handover for the interested services. Based on the obtained MBMS information, if the subscribed MBSFN area also exists in the target cell, then the UE automatically continues to receive subscribed services from the same MBSFN area. On the other hand, if the subscribed MBSFN area does not exist in the target cell, then the UE reads the MCCH of the target cell to find out whether the subscribed services are provided in the new MBSFN areas. Furthermore, if the subscribed services are found in more than one MBSFN areas, then decision needs to be made as to which MBSFN area should be used for continued MBMS service. In addition, for each interested MBMS service, UE81 may apply the method illustrated in FIG. 5 for continuous service reception.

Now take FIG. 8 as an example. In source cell 84, UE81 initially subscribes program D from MBSFN area 1. Before or after UE81 handovers from source cell 84 to target cell 85, UE81 obtains MBMS information of target cell 85. From the obtained MBMS information, UE81 knows that MBSFN area 2 and MNSFN area 3 are both available in target cell 85, but MBSFN area 1 is not available in target cell 85. As a result, UE81 cannot automatically resume service for program D. Instead, UE81 reads the MCCH of target cell 85 and knows that program D is provided from both MBSFN area 2 and MBSFN area 3. In one example, UE81 prompts the user as to which MBSFN area to continue to receive service for program D. In another example, such decision is made based on a predefined algorithm or priority via RRC messaging. For instance, MBSFN area 2 is selected because it provides program D with higher resolution or higher modulation and coding scheme (MCS). However, if both programs C and D are originally subscribed from MBSFN area 1, then it is much likely that MBSFN area 3 would be selected because it provides both programs C and D as compared to MBSFN area 2 that only provides program D.

The above-illustrated scenario can be extended to a more general situation with carrier aggregation. With carrier aggregation, an eNB can have one or more CCs. Referring back to FIG. 1, for example, eNB13 and eNB15 could be one eNB, and this eNB belongs to two MBSFN areas on CC1 and one MBSFN area on CC2 (note that the MBSFN area 1 on CC1 is not the same as the MBSFN area 1 on CC2). When a target eNB supports multiple MBSFN areas over multiple CCs, carrier aggregation is indicated in the handover command, i.e. multiple target cells on multiple carrier frequencies, and MBMS is provided on more than one frequencies (number of frequencies in handover command that support MBMS is X, e.g., X=4). However, the UE is only capable of receiving MBMS on Y number of carrier frequencies, and Y is less than X due to UE capability (e.g., Y=2). To maintain MBMS service continuity under such situation, a preferred MBSFN area is selected based on user preference or a predetermined priority, as illustrated in FIG. 8.

It should be noted that, although the solutions described above with regard to FIGS. 7 and 8 are illustrated for handover procedure when the UE is in RC_CONNECTED state, similar solutions could be applied for cell reselection procedure when the UE is in RC_IDLE state. For each interested MBMS service or program, UE can apply the method illustrated in FIG. 6 to maintain service continuity after cell reselection.

Furthermore, if a UE can subscribe to more than one MBSFN areas and a service is provided in more than one MBSFN areas, then decision can be made as to which MBSFN area to subscribe the service via NAS (e.g., prompt user) or RRC (i.e., based on predefined algorithm or priority). In one example, if a service is provided in more than one MBSFN areas and the UE already subscribed the service from one MBSFN area, then RRC shall select the same MBSFN area to receive the service after handover/reselection. In another example, if a service is provided in more than one MBSFN areas, RRC shall select the MBSFN area for which the service is provided in the configuration or format best match the user requirement, i.e., higher resolution, higher MCS, etc. after handover/reselection.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a subscribed multimedia broadcast multicast service (MBMS) service by a user equipment (UE) in a source cell;
   performing handover to a target cell;
   obtaining MBMS information of the target cell, wherein the MBMS information comprises an MBMS single frequency network (MBSFN) area ID of the target cell; and
   determining MBMS service continuity in the target cell, wherein the UE releases MBMS bearer and informs a non-access stratum (NAS) entity if the subscribed MBMS service is unavailable after handover, and wherein the UE keeps MBMS bearer during handover if the subscribed MBMS service is available after handover.

2. The method of claim 1, wherein the source cell and the target cell belong to the same MBSFN area, and wherein the UE reuses MBMS information of the source cell after handover.

3. The method of claim 1, wherein the source cell and the target cell belong to different MBSFN areas, and wherein the UE obtains an MBMS service list from a multicast control channel (MCCH) of the target cell.

4. The method of claim 1, further comprising:
   providing a user prompt through a user interface of the UE for whether to continue the subscribed MBMS service in the target cell.

5. The method of claim 1, wherein the UE subscribes multiple MBMS services from one or more MBSFN areas, and wherein the UE determines whether the subscribed MBMS services are available by checking each multicast control channel (MCCH) of each MBSFN area supported by the target cell.

6. The method of claim 1, wherein the subscribed MBMS service is provided by multiple MBSFN areas supported by the target cell, and wherein a preferred MBSFN area is selected based on user preference or a predetermined priority.

7. The method of claim 1, wherein the UE receives a handover command indicating a first number of carrier frequencies supporting MBMS by a target eNB, wherein the UE is capable of receiving MBMS over a second number of carrier frequencies, and wherein a preferred MBSFN area is selected based on user preference or a predetermined priority.

8. A user equipment (UE), comprising:
   a radio frequency (RF) module that receives a subscribed multimedia broadcast multicast service (MBMS) service from a multimedia broadcast service center (MBSC);
   a handover (HO) module that performs handover from a source cell to a target cell; and
   an MBMS module that obtains MBMS information of the target cell, wherein the MBMS information comprises an MBMS single frequency network (MBSFN) area ID, wherein the UE releases MBMS bearer and informs a non-access stratum (NAS) entity if the subscribed MBMS service is unavailable after handover, and wherein the UE keeps MBMS bearer during handover if the subscribed MBMS service is available after handover.

9. The UE of claim 8, wherein the source cell and the target cell belong to the same MBSFN area, and wherein the UE reuses MBMS information of the source cell after handover.

10. The UE of claim 8, wherein the source cell and the target cell belong to different MBSFN areas, and wherein the UE obtains an MNMS service list from a multicast control channel (MCCH) of the target cell.

11. The UE of claim 8, further comprising:
a user interface module that provides a user prompt for whether to continue the subscribed MBMS service in the target cell.

12. The UE of claim 8, wherein the UE subscribes multiple MBMS services from one or more MBSFN areas, and wherein the UE determines whether the subscribed MBMS services are available by checking each multicast control channel (MCCH) of each MBSFN area supported by the target cell.

13. The UE of claim 8, wherein the subscribed MBMS service is provided by multiple MBSFN areas supported by the target cell, and wherein a preferred MBSFN area is selected based on user preference or a predetermined priority.

* * * * *